(12) United States Patent
Farooq et al.

(10) Patent No.: US 9,205,803 B2
(45) Date of Patent: Dec. 8, 2015

(54) DEPLOYABLE UPPER LEG STIFFENER FOR PEDESTRIAN PROTECTION

(71) Applicant: Ford Global Technologies, LLC, Dearborn, MI (US)

(72) Inventors: Iskander Farooq, Novi, MI (US); Mohammed Omar Faruque, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 41 days.

(21) Appl. No.: 14/146,928

(22) Filed: Jan. 3, 2014

(65) Prior Publication Data

US 2015/0191145 A1    Jul. 9, 2015

(51) Int. Cl.
*B60R 21/38*    (2011.01)
*B60R 21/00*    (2006.01)

(52) U.S. Cl.
CPC ......... *B60R 21/38* (2013.01); *B60R 2021/0053* (2013.01)

(58) Field of Classification Search
CPC .. B60R 21/34; B60R 21/38; B60R 2021/343; B60R 2021/0053; B60R 2021/0055
See application file for complete search history.

(56) References Cited

U.S. PATENT DOCUMENTS

| 1,865,014 | A | * | 6/1932 | Heinrich | 293/45 |
|---|---|---|---|---|---|
| 3,791,468 | A | | 2/1974 | Bryan, Jr. | |
| 3,829,140 | A | * | 8/1974 | Jehu et al. | 293/15 |
| 3,922,014 | A | | 11/1975 | Hinderks | |
| 4,093,290 | A | * | 6/1978 | Pearson | 293/15 |
| 4,867,397 | A | | 9/1989 | Pamadi et al. | |
| 4,904,016 | A | | 2/1990 | Tatsumi et al. | |
| 4,996,783 | A | * | 3/1991 | Fresia | 37/245 |
| 5,046,768 | A | * | 9/1991 | Myslicki | 292/68 |
| 5,403,059 | A | | 4/1995 | Turner | |
| 5,458,391 | A | | 10/1995 | Ito et al. | |

(Continued)

FOREIGN PATENT DOCUMENTS

| DE | 19911833 A1 | 9/1999 |
|---|---|---|
| DE | 10059202 A1 | 7/2002 |

(Continued)

OTHER PUBLICATIONS

Intellectual Property Office, Search Report for the corresponding Great Britain Patent Application No. GB1422829.0 mailed Mar. 9, 2015.

(Continued)

*Primary Examiner* — Paul N Dickson
*Assistant Examiner* — Timothy Wilhelm
(74) *Attorney, Agent, or Firm* — Frank A. MacKenzie; Brooks Kushman P.C.

(57) ABSTRACT

A pedestrian safety system for use with a motor vehicle includes a vehicle hood movable between a closed position and a raised position wherein a leading edge of the hood is raised relative to a front surface of the vehicle to form a gap, and a leg stiffener movable between a retracted position wherein it is beneath the hood when the hood is closed and a deployed position wherein the stiffener projects through the gap and is forward of the leading edge of the hood when the hood is raised. At least one actuator mounted beneath the hood moves the stiffener between the retracted and deployed positions. A remote sensing system detects an impending collision with a pedestrian and triggers the raising of the hood and extension of the actuators.

20 Claims, 3 Drawing Sheets

(56) References Cited

U.S. PATENT DOCUMENTS

| | | | |
|---|---|---|---|
| 5,924,756 A | 7/1999 | Homa | |
| 6,447,049 B1 * | 9/2002 | Tohda et al. | 296/180.1 |
| 6,676,179 B2 | 1/2004 | Sato et al. | |
| 6,736,447 B2 | 5/2004 | Angelo et al. | |
| 6,736,449 B2 | 5/2004 | Takahashi et al. | |
| 6,802,556 B2 * | 10/2004 | Mattsson et al. | 296/187.09 |
| 7,077,439 B2 | 7/2006 | White et al. | |
| 7,192,079 B2 | 3/2007 | Schramm et al. | |
| 7,331,413 B2 | 2/2008 | Okai et al. | |
| 7,377,580 B1 | 5/2008 | Ekladyous | |
| 7,469,955 B2 * | 12/2008 | Patterson et al. | 296/187.03 |
| 7,621,364 B2 | 11/2009 | Haglund | |
| 7,735,902 B2 | 6/2010 | Wurtemberger | |
| 7,740,293 B2 | 6/2010 | Kim | |
| 7,836,996 B2 * | 11/2010 | Kitte et al. | 180/271 |
| 7,837,256 B2 | 11/2010 | Takayanagi et al. | |
| 7,845,691 B2 | 12/2010 | Sundararajan et al. | |
| 7,905,314 B2 | 3/2011 | Mathevon et al. | |
| 8,100,444 B2 | 1/2012 | Erzgraeber et al. | |
| 8,141,918 B2 | 3/2012 | Miller et al. | |
| 8,210,600 B1 | 7/2012 | Verhee et al. | |
| 8,276,953 B2 | 10/2012 | Erzgraeber et al. | |
| 8,534,410 B2 * | 9/2013 | Nakaura et al. | 180/274 |
| 2008/0258489 A1 * | 10/2008 | Ebner et al. | 296/77.1 |
| 2010/0230195 A1 | 9/2010 | Ginja et al. | |
| 2010/0244484 A1 | 9/2010 | Nakaura et al. | |
| 2010/0270813 A1 * | 10/2010 | Roth et al. | 292/121 |
| 2012/0074715 A1 | 3/2012 | Kim | |

FOREIGN PATENT DOCUMENTS

| | | |
|---|---|---|
| DE | 10254733 A1 | 6/2004 |
| FR | 2445783 A1 | 8/1980 |
| JP | 2007217206 A | 8/2007 |
| WO | 2007097641 A1 | 8/2007 |
| WO | 2008007090 A1 | 1/2008 |

OTHER PUBLICATIONS

Peter J. Schuster, Current Trends in Bumper Design for Pedestrian Impact, California Polytechnic State University, Copyright 2008.

* cited by examiner

DEPLOYABLE UPPER LEG STIFFENER FOR PEDESTRIAN PROTECTION

TECHNICAL FIELD

The present invention relates generally to vehicle-mounted pedestrian protection devices for motor vehicles and, more specifically, to a deployable stiffener for upper leg protection.

BACKGROUND

Several national and multi-national vehicle safety organizations have formulated pedestrian safety standards which new vehicles are measured against. At least one such safety standard utilizes a test procedure which simulates a vehicle striking the upper leg of a pedestrian standing or walking in front of the vehicle. For some vehicle designs, contact with the upper leg is made by the leading edge of the vehicle hood and/or portions of the vehicle immediately below the hood leading edge.

Some motor vehicles have a front-end shape that is relatively low for visibility, aerodynamic, and/or styling reasons. As a result, there may be a relatively small amount of clearance between the front-end panels (hood, fender, grille, head lamps, etc.) and the vehicle's structural frame and/or other rigid components (powertrain, suspension, etc.) beneath the panels (within the engine bay, for example). In general, more clearance is believed to improve pedestrian safety because it provides "crush space" through which the relatively deformable front-end panels can deflect when struck by a pedestrian. Exterior panel deformation absorbs kinetic energy of the collision before the pedestrian strikes the rigid components inside the vehicle front-end.

It has been proposed to increase the under-hood crush space by raising or lifting the vehicle hood from its normal operating position immediately prior to a pedestrian impact. Known systems include crash detection and/or prediction sensors that trigger actuators which adjust the position of the hood in reaction to the detected/predicted impact. Raising the vehicle hood, however, may not provide sufficient reduction in severity of injury caused by the leading edge of the hood striking the pedestrian's upper leg.

U.S. Pat. No. 7,845,691B2 discloses a pedestrian safety system in which a pedestrian collision sensing device activates a hood release and a lifting actuator to raise the hood to a raised condition, thereby providing additional deformation space beneath the hood.

SUMMARY

In an embodiment disclosed herein, apparatus for a motor vehicle comprises a hood movable between a closed condition and a raised condition in which a gap is formed between a leading edge of the hood and a front surface of the vehicle (such as a grille), and a leg stiffener movable between a retracted position wherein it is beneath the hood in the closed condition and a deployed position wherein it projects through the gap and is forward of the hood leading edge. When in the deployed position, the stiffener provides an improved transfer of kinetic energy to the upper leg of a pedestrian struck by the vehicle so as to reduce the likelihood and/or severity of injury.

In another embodiment disclosed herein, a safety system for use with a motor vehicle comprises a hood movable between a closed position and a raised position wherein a leading edge of the hood is raised relative to a front surface of the vehicle to form a gap, a leg stiffener movable between a retracted position wherein it is beneath the hood when the hood is closed and a deployed position wherein the stiffener projects through the gap and is forward of the leading edge of the hood when the hood is raised, at least one actuator moving the stiffener between the retracted and deployed positions, and a remote sensing system detecting an impending collision with a pedestrian and triggering the actuators.

The actuator may be electromechanical, pneumatic, or pyrotechnic, and may be resettable to return the stiffener to the retracted position after deployment. The actuators are mounted to structure of the vehicle beneath the hood, such as a radiator support bracket.

In another embodiment disclosed herein, apparatus for use with a hood of a motor vehicle comprises a leg stiffener mounted beneath the hood and movable relative to the vehicle between a retracted position beneath the hood when the hood is closed and a deployed position extending forward of a leading edge of the hood when the hood is raised.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
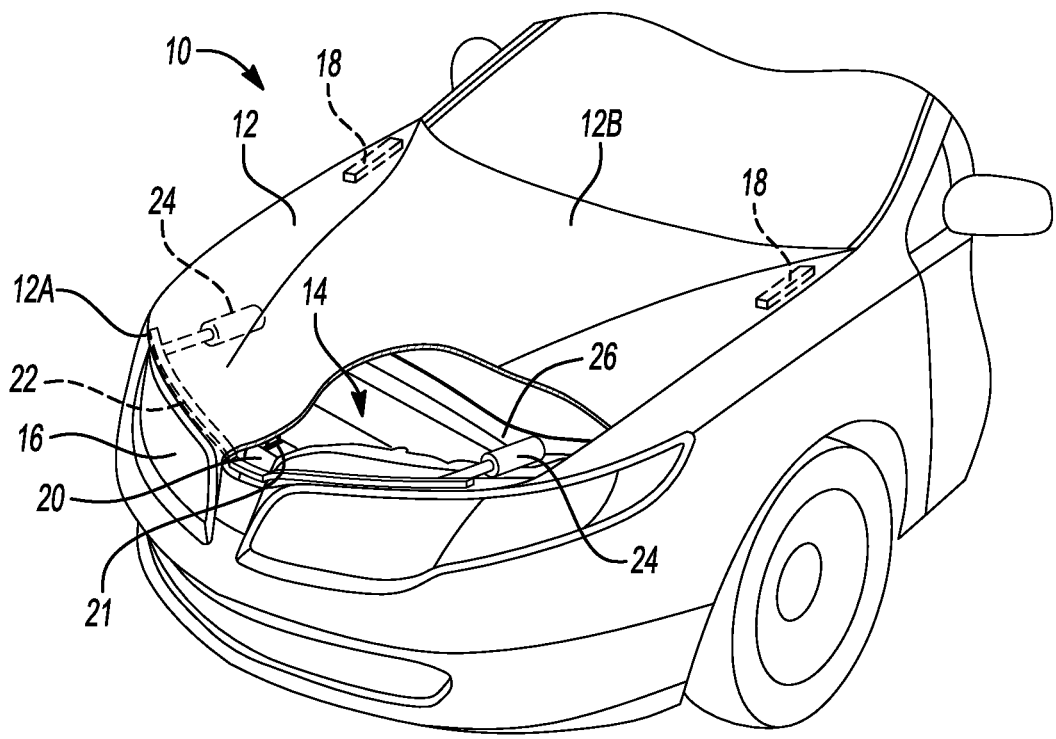
FIG. 1 shows a schematic perspective view of a front portion of a motor vehicle with a leg spoiler in a retracted position.

FIG. 1 depicts the forward portion of a vehicle 10 having a hood 12 covering an engine compartment 14. Hood 12 is shown in a closed condition wherein a leading edge 12A of the hood is disposed immediately above a front surface of the vehicle to present a substantially unbroken, aerodynamic contour. The front surface of the vehicle below leading edge 12A may comprise, for example, an ornamental or functional grille 16. Hood 12 is connected to the body of the vehicle 10 by hinges 18 which may be located adjacent to a rear edge 12B of the hood.

Hood 12 is shown as a single component for simplify of illustration but, as is well known in the art, normally comprises two or more layers of steel, aluminum, fiberglass, or other composite material secured together.

Figure 2:
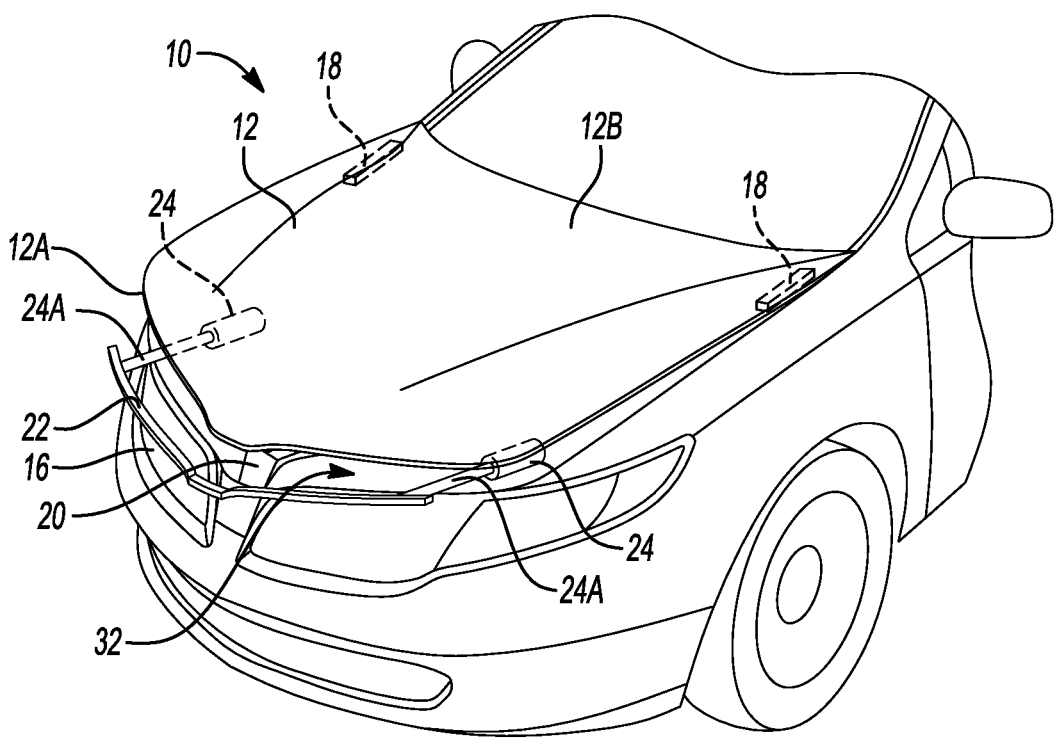
FIG. 2 shows a schematic perspective view of the motor vehicle of FIG. 1 with the leg spoiler in a deployed position.

A latch mechanism 20 (shown in greater detail in FIGS. 5, 6) is disposed beneath hood 12 and adjacent to leading edge 12A and selectively engages a striker 21 secured to the interior (lower) surface of hood 12. Latch mechanism 20 operates to alternatively a) retain the hood in the fully closed condition (FIG. 1), and b) allow the leading edge 12A to move upward at least as far as the raised condition (FIG. 2). Latch mechanism 20 may also be operative to apply an upward force to raise the hood 12 to the raised condition. Such an "active" hood latch is disclosed in U.S. Pat. No. 7,845,691B2, the disclosure of which is incorporated herein by reference. Latch mechanism 20 may be further operable to completely release hood 12 so that the hood 12 so that it may be fully opened (not shown).

Hinges 18 permit hood leading edge 12A to move upwardly relative to the vehicle 10 at least as far as the raised condition, wherein a relatively narrow gap 32 exists between hood leading edge 12A and grille 16. Hinges 18 may be configured to allow hood rear edge 12B to lift, rather than simply pivoting about the hinge. Hinges 18 may further permit movement of the hood to a fully opened position (not shown) to provide access to the engine compartment for maintenance, servicing, inspection, or other purposes. Alternatively, a separate hinge or hinges (not shown) may be provided that allow hood 12 to open fully.

A leg stiffener 22 is located immediately beneath the forward portion of hood 12. When in a retracted position (which coincides with hood 12 being in its closed condition, see FIGS. 1 and 3), stiffener 22 is beneath and closely adjacent to hood leading edge 12A and is substantially enclosed by the hood. During normal vehicle operation, hood 12 is in the closed condition and stiffener 22 is in the retracted position. "Normal vehicle operation" is hereby defined as prior to a detected or predicted collision with a pedestrian.

Stiffener 22 is mounted to left and right actuators 24 which are mounted to vehicle structure beneath the hood 12, such as radiator support structure 26. Actuators 24 may be mounted to any appropriate under-hood vehicle structure in or near the engine compartment 14 without departing from the scope of the present invention. For example, actuators 24 may be attached to front suspension towers (not shown). Actuators 24 may be powered by any appropriate source of power, such as electromechanical, pneumatic, hydraulic or pyrotechnic, all of which are well known in the art.

As is well known in the art, vehicle 10 may be equipped with one or more sensors 28 (indicated schematically in FIGS. 3 and 4) which sense an actual and/or imminent and/or probable collision between the vehicle and a pedestrian. Sensor 28 may, for example, be a contact sensor mounted directly to the front surface of the vehicle (the bumper, for example) for detecting an actual collision. Alternatively or additionally, the sensor 28 may comprise a remote sensor, such as an optical, radar, lidar (also known as laser radar), or ultrasonic sensing system for detecting an impending or possible collision based upon the presence and/or dynamic state of a pedestrian and/or other object in the environment prior to contact with the vehicle. Any combination of the remote or contact sensors may be used in combination to provide accurate and reliable collision and/or pre-collision sensing.

Based (at least in part) on inputs from the sensor(s) 28, an electronic control module (ECM) 30 activates one or more safety devices or systems to reduce the likelihood and/or severity of injury to the pedestrian. One such known pedestrian safety system activates latch mechanism 20 and/or other actuators (not shown) to move hood 12 to the raised condition prior to the pedestrian striking the hood. Compared with a closed hood, the raised condition provides increased vertical clearance between the hood and any rigid (non-yielding) objects in the engine compartment. Hood 12 may be engineered to yield or deflect so as to absorb kinetic energy of the impact, thereby providing an amount of cushioning. ECM 30 may control only pedestrian safety devices/systems, or it may also control or electronically interface with other vehicle safety devices/systems, such as occupant restraints and collision warning/avoidance systems.

When an actual or impending collision with a pedestrian is detected by the sensor(s) 28, ECM 30 triggers latch mechanism 20 (and/or other hood release/actuator devices) to release hood 12 and move it to the raised condition. When in the raised condition, hood leading edge 12A is raised relative to the adjacent front surface of the vehicle to the form a gap 32 (see FIG. 4) below the hood leading edge. Gap 32 is sufficiently large to allow stiffener 22 to project through, as described below. In one test vehicle, the hood is lifted approximately 40 mm.

The force to move hood 12 to the raised condition may be provided by springs or other appropriate devices associated with latch mechanism 20. Additional or alternatively, hood lifting force may be provided by separate springs or actuators (not shown) located in the other positions in or near the engine compartment 14.

Figure 4:
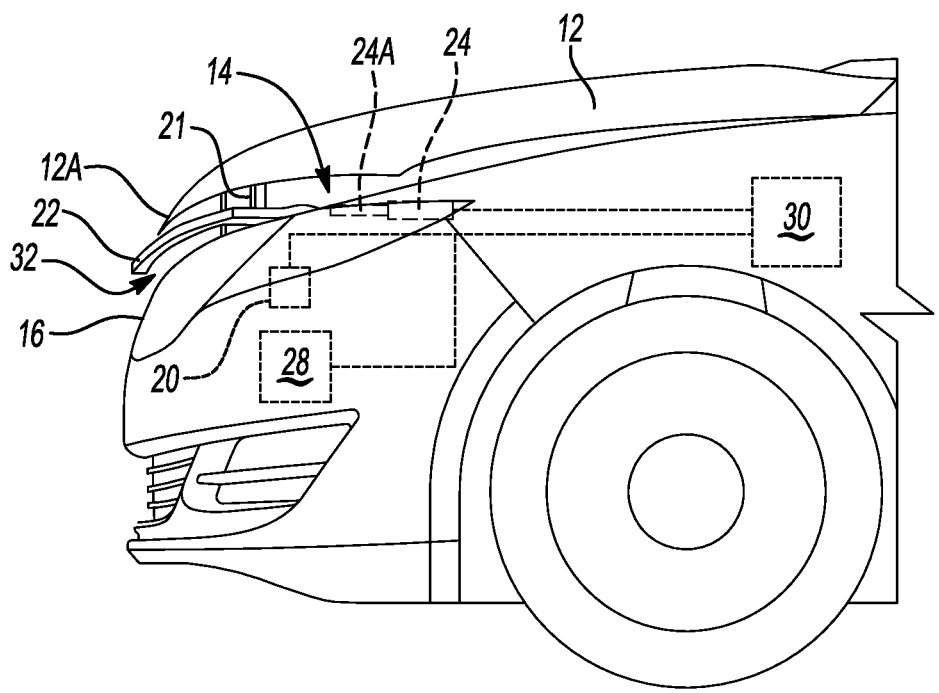
FIG. 4 shows a schematic side view of the motor vehicle of FIG. 3 with the leg spoiler in a deployed position.

Once hood leading edge 12A has been lifted, actuators 24 are activated to extend actuator rods 24A and thereby urge stiffener 22 to its deployed position wherein it projects through the gap 32 and is forward of the hood leading edge 12A (see FIG. 4). In the deployed position, stiffener 22 provides an improved transfer of kinetic energy to the upper leg of a pedestrian so as to reduce the likelihood and/or severity of injury. As seen in FIG. 4, stiffener 22 may when deployed be positioned approximately even with the forward-most position of the vehicle front surface or bumper. The most advantageous position of stiffener 22 will depend on the overall geometry of the vehicle front end, and may be determined by computer modeling and/or testing using a leg-form to simulate pedestrian impacts, as is well known in the art.

Stiffener 22 may be fabricated from any appropriate material as necessary to achieve desired mechanical characteristics (strength, impact absorption, etc.). Examples of such materials include aluminum, steel, fiber reinforced plastic, and/or other composites. Actuators 24 and/or actuator rods 24A may be designed to absorb collision energy by any appropriate means, such as springs, pneumatics, elastic and/ or plastic deformation, etc.

Figure 3:
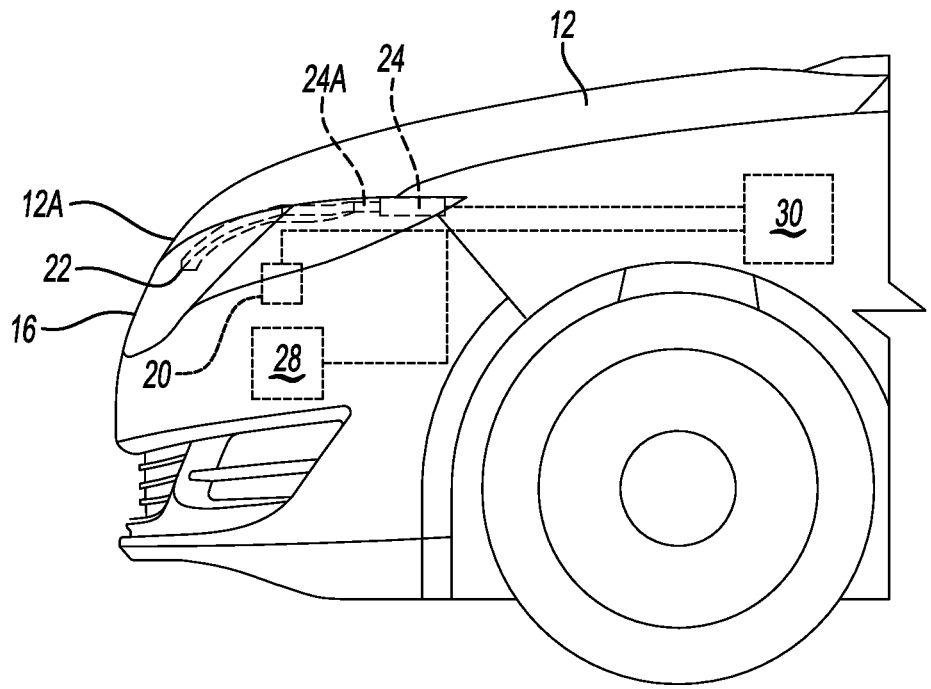
FIG. 3 shows a schematic side view of a front portion of a motor vehicle with a leg spoiler in a retracted position.

The axis along which stiffener 22 is deployed by actuators 24 is shown in FIGS. 3 and 4 as being generally parallel with the longitudinal axis of the vehicle 10, or horizontal when the vehicle is on a flat, horizontal road surface. The deployment axis may, however, be angled upward or downward with respect to the vehicle longitudinal axis. This may, for example, be required to provide proper positioning of the deployed stiffener and/or to permit efficient mounting/packaging when retracted.

Figure 5:
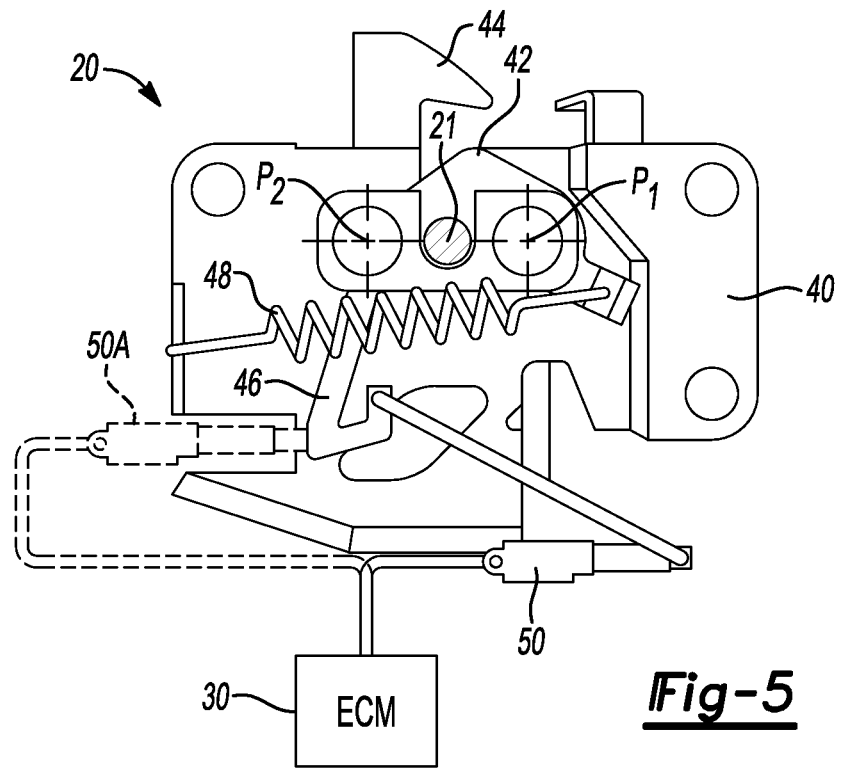
FIG. 5 shows a schematic view of an active hood latch actuator holding a hood in a closed condition.
Figure 6:
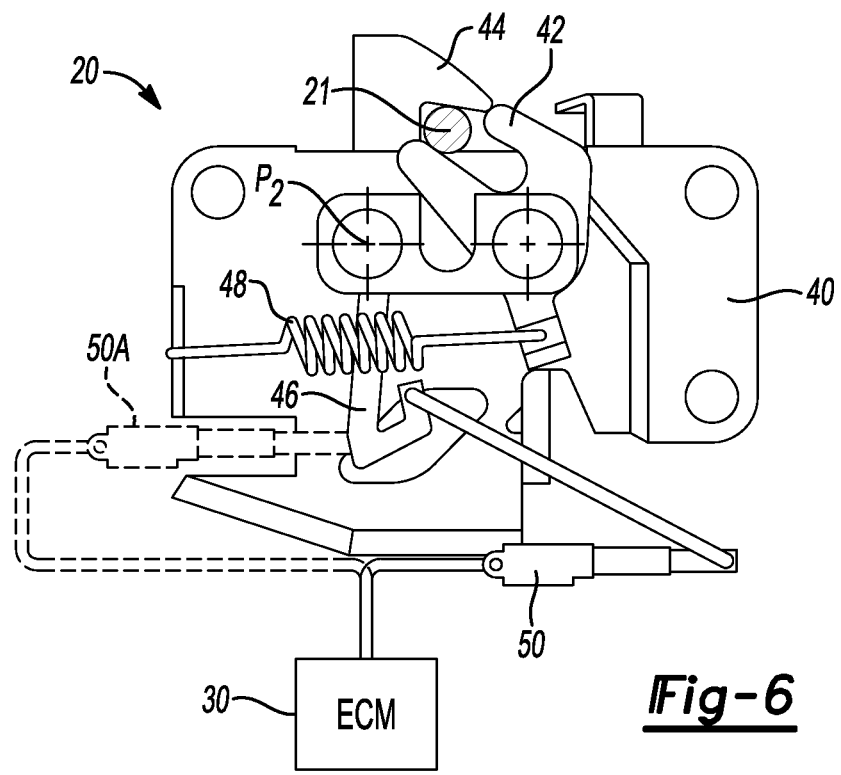
FIG. 6 shows a schematic view of the active hood latch actuator of FIG. 5 holding the hood in a raised condition.

FIGS. 5 and 6 show an embodiment of a hood latch 20 comprising a mounting portion 40 for securing the latch to vehicle structure beneath hood 12, a primary latch 42, and a secondary latch 44. Primary latch 42 is rotatable about pivot axis P1 and is retained in the latched position shown in FIG. 5 by engagement with a release pawl 46. Primary latch 42 holds striker 21 in the full-down position to secure hood 12 in the fully closed position. In this position, spring 48 is in tension and applies a clockwise (as viewed in FIGS. 5 and 6) rotational force to primary latch 42

A hood latch actuator 50 (such as a solenoid or a voice-coil) extends to apply force to release pawl 46, rotating it counter-clockwise (about pivot axis P2) and thereby unlocking primary latch 42. When unlocked, spring 48 shortens and rotates primary latch 42 clockwise to the position shown in FIG. 6 wherein the primary latch urges striker 21 upward against secondary latch 44. The vertical distance travelled by striker 21 between the FIG. 5 and FIG. 6 positions lifts hood 12 to the raised condition (see FIGS. 1 and 3). An alternative mounting for a hood latch actuator 50A is indicated in phantom lines.

Hood latch actuator 50 is, like the stiffener actuators 22, activated by ECM 30 in response to an actual and/or predicted collision with a pedestrian. Actuator 50 may also be activated manually by a control (not shown) in the passenger compartment when a vehicle operator desired to open the hood 12 for inspection or servicing. The secondary latch 44 may be manually actuated to open the hood 12 beyond the raised position, as is well known in the art.

Stiffener 22 may be shaped to follow or match the contour of hood leading edge 12A and/or a contour of the vehicle front structure (the grille, for example) immediately below the leading edge. In the illustrated embodiment, for example, the lateral midpoint (relative to vehicle 10) is the lowest and forward-most point of stiffener 22, and it curves upward and rearward towards both its left and right ends, matching the shape of hood leading edge 12A. This allows the stiffener 22 to be located as far forward as possible when in the retracted position and thereby minimize the travel distance required to reach the deployed position.

Depending upon the construction and desired appearance of the vehicle, it is possible for stiffener 22 to be exposed beneath the hood leading edge 12A when the stiffener is retracted and the hood is closed. For example, a front surface of stiffener 22 may be visible (to a person positioned generally forward of the vehicle) to create an ornamental trim-line between hood leading edge 12A and grille 16 or other component(s) included in the front structure of the vehicle. A configuration in which some portion of the retracted stiffener 22 is visible beneath the leading edge of the closed hood 12 is included in the present description referring to stiffener 22 as being "beneath" the hood.

Actuators 24 may be capable of returning to the retracted position after an actuation, a feature commonly referred to a being "resettable." If stiffener 22 is deployed in response to an expected/predicted pedestrian impact that does not actually occur, the reset feature is employed to return the stiffener to its retracted position. The reset of stiffener 22 may be performed upon a command from the vehicle operator and/or after a set amount of time has elapsed since stiffener deployment.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Pedestrian protection apparatus for a motor vehicle comprising:
    a hood movable between a closed condition and a raised condition wherein the hood is raised relative to a front surface of the vehicle forming a gap between a leading edge of the hood and the front surface; and
    a transverse bar movable between a retracted position wherein it is beneath the hood in the closed condition and a deployed position wherein the bar projects through the gap and is disposed forward of the hood leading edge in the raised condition.

2. The apparatus of claim 1 further comprising an actuator moving the bar between the retracted and deployed positions.

3. The apparatus of claim 2 wherein the actuator is one of a pneumatic, a pyrotechnic, and an electromechanical actuator.

4. The apparatus of claim 2 further comprising a remote sensing system detecting an impending collision with a pedestrian and triggering the actuator in reaction to the impending collision.

5. The apparatus of claim 2 wherein the actuator is operable to return the bar to the retracted position after deployment.

6. The apparatus of claim 2 wherein the actuator is mountable to a radiator support structure of the vehicle.

7. The apparatus of claim 1 further comprising a hood lifting device operable to move the hood to the raised condition.

8. The apparatus of claim 1 wherein the bar is shaped to follow a contour of the hood leading edge.

9. The apparatus of claim 1 wherein the bar is shaped to follow a contour of the front surface immediately below the hood.

10. A safety system for use with a motor vehicle, comprising:
    a hood movable between a closed position and a raised position wherein a leading edge of the hood is raised relative to a front surface of the vehicle to form a gap between the leading edge and the front surface;
    a leg stiffener movable between a retracted position wherein it is beneath the hood when the hood is closed and a deployed position wherein the stiffener projects through the gap and is forward of the leading edge of the hood when the hood is raised;
    an actuator moving the stiffener between the retracted and deployed positions; and
    a remote sensing system detecting an impending collision with a pedestrian, the actuator triggered when the impending collision is detected.

11. The system of claim 10 wherein the actuator is one of a pneumatic, a pyrotechnic, and an electromechanical actuator.

12. The system of claim 10 wherein the actuator is operable to return the stiffener to the retracted position after deployment.

13. The system of claim 10 wherein the actuator is mountable to a radiator support structure of the vehicle.

14. The system of claim 10 further comprising a hood lifting device operable to move the hood to the raised position.

15. The system of claim 10 wherein the stiffener is shaped to follow a contour of the hood leading edge.

16. Apparatus for a motor vehicle, comprising:
    a leg stiffener mounted beneath a vehicle hood and movable between a retracted position beneath the hood when the hood is closed and a deployed position extending forward of a leading edge of the hood and through a gap between the leading edge and a vehicle front surface when the hood is in a raised position wherein the leading edge is raised relative to the vehicle front surface.

17. The apparatus of claim 16 further comprising an actuator moving the stiffener between the retracted and deployed positions.

18. The apparatus of claim 17 further comprising a remote sensing system detecting an impending collision with a pedestrian and triggering the actuator in reaction to the impending collision.

19. The apparatus of claim 17 wherein the actuator is mountable to a radiator support structure of the vehicle.

20. The apparatus of claim 16 wherein the stiffener is shaped to follow a contour of the hood leading edge.

* * * * *